Jan. 17, 1928.
W. J. MORSE
1,656,385
SIGNALING DEVICE
Filed April 21, 1927
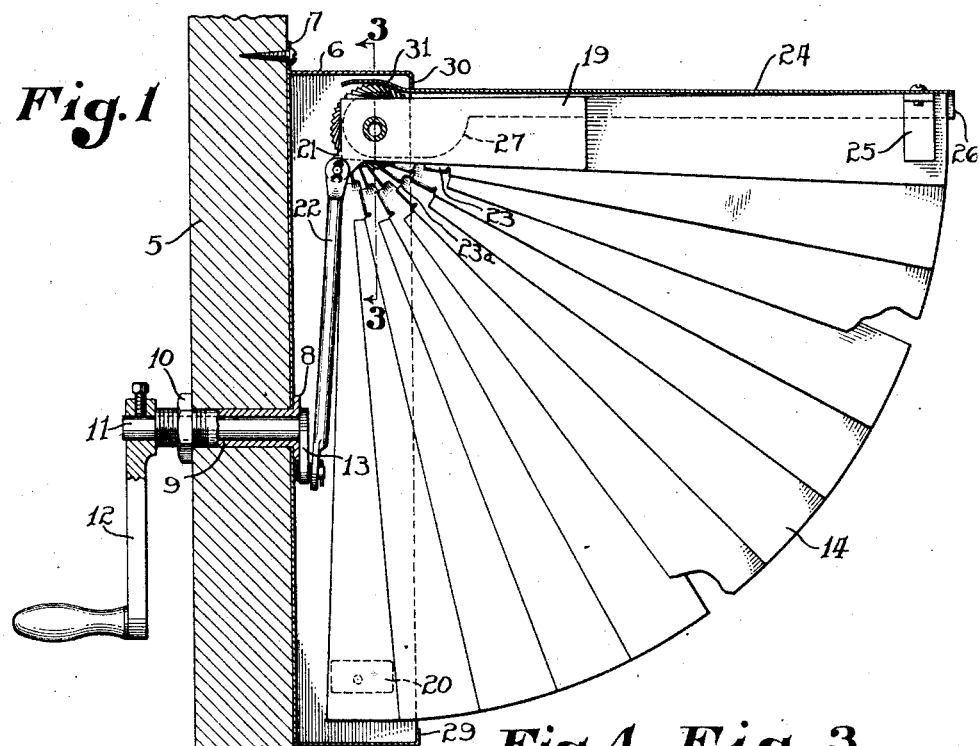
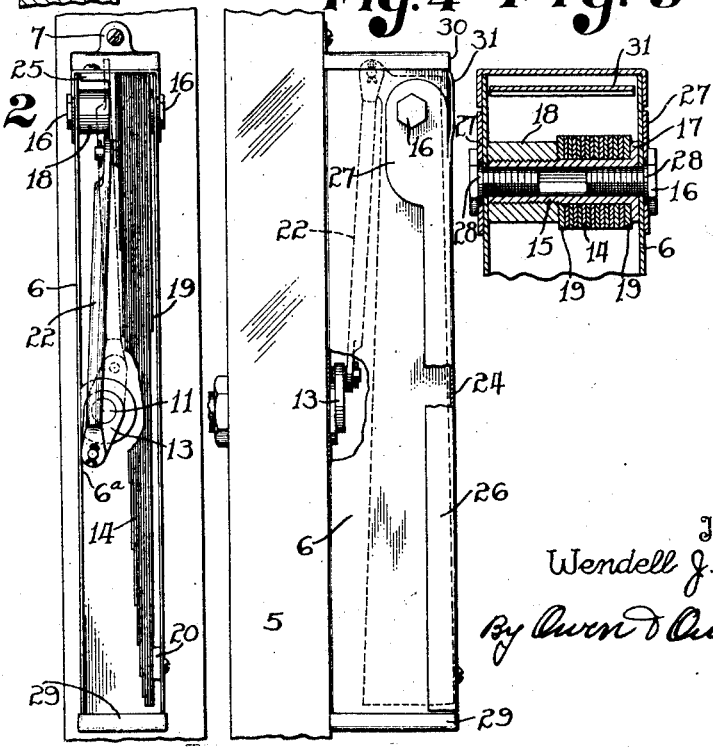
Inventor
Wendell J. Morse
By Owen D Owen
Attorneys Patented Jan. 17, 1928.

1,656,385

UNITED STATES PATENT OFFICE.

WENDELL J. MORSE, OF TOLEDO, OHIO.

SIGNALING DEVICE.

Application filed April 21, 1927. Serial No. 185,374.

This invention relates to a signaling device adapted to be used on automobiles and the like for indicating to those in the rear the driver's intention to stop or to make a turn. It is especially adapted to be used on closed cars and to be operated from the inside of the car without the necessity of keeping a window open adjacent the driver's seat.

The object of the invention is to provide a signaling device for the purpose stated, which will be simple and practical in construction, easily installed, easily operated, and which may be folded so as to be entirely out of the way when not needed.

The specific construction of the invention in its preferred form and the advantages thereof will be more particularly explained in connection with the accompanying drawing constituting a part hereof.

In the drawing, Figure 1 is a vertical section taken transversely of one side of an automobile body, showing the device installed thereon, in extended position, parts of the device being broken away. Fig. 2 is a view in elevation looking from the right of Fig. 1. Fig. 3 is an enlarged detail sectional view taken on the line 3—3 of Fig. 1, and Fig. 4 is a front elevation of the device folded, parts being broken away.

The device is illustrated in connection with a side of an automobile body 5 and comprises a comparatively long substantially rectangular housing 6 disposed vertically adjacent the body 5 with its upper end provided with an extended flange or ear 7 for securing the same to the body. This housing, substantially midway between its upper and lower ends, is secured to the body 5 by a flange 8 formed at the outer end of a bushing 9 which extends through the side of the body 5 and is held rigidly by a nut 10 on its inner end. The bushing 9 constitutes a bearing for a rock shaft 11 which has a hand crank 12 secured to its inner end. The crank 13 is secured to the outer end of the rock shaft 11 and is adapted to be operatively connected to the signaling member.

The signaling member comprises a series of fan-shaped blades 14, pivotally mounted adjacent each other on a bushing 15 which is held in position within the housing 6 by a pair of oppositely disposed bolts 16, threaded into the ends thereof. The blades 14 are held closely together to prevent rattling, between a circumferential flange 17 at one end of the bushing 15 and a spacing sleeve 18 screwed onto the other end of the bushing.

The inner portions of the front and rear blades 14 are respectively provided with reinforcing strips 19 which may be soldered or otherwise secured thereto. The outer or lower end of the rearmost blade 14 is secured to the side wall of the housing 6 by a suitable lug 20. The front blade 14 or its reinforcing strip 19 has an ear 21 extending inwardly at an angle and constituting a crank, by means of which said blade may be raised or lowered about the bushing 15 as a center. The ear 21 is connected by a rod 22 with the crank 13 so that it may be actuated by the hand crank 12.

Each blade 14, except the rearmost one, is formed near its inner end with a rearwardly turned flange 23, adapted to engage the edge of a notch 23ª formed in the next adjacent blade as soon as the latter has been uncovered so that as the front blade 14 is raised to a horizontal position, all of the successive blades will be drawn outwardly like a fan. For convenience, flanges 23 and the corresponding notches 23ª may be arranged in staggered relation. The several blades are set in close contact with one another and, when closed, are in exact registry, the edges being indicated by dotted lines in Figure 4.

The front blade 14 has a cover plate 24 disposed in a plane at right angles to its outer edge and secured at one end thereto by means of an angle brace 25. The sides of this plate 24 are formed with inturned flanges 26 adapted to overlap the sides of the housing 6 when the signaling member is folded. At the inner end, the flanges 26 are formed with extensions 27 which have bearings on annular shoulders 28 formed on the bolts 16. These shoulders act as spacers to permit a free pivotal movement of the cover plate about the bolts. The lower end of the housing 6 is formed with a rim 29 adjacent which the end of the cover plate 24 fits when the device is closed. The upper end of the housing 6 is formed with a rim 30 against which the cover plate 24 fits when in horizontal position, as shown in Fig. 1. The cover plate 24 has an inward extension 31 which is slightly curved to avoid interfering with the inner ends of the blades 14 and which serves, when the device is closed, to complete the closure of the outer face of the housing.

The blades 14, when closed, occupy the outer portion of the housing, while the connecting rod 22 and the cranks 13 and 21 are located within the inner portion of the housing. When the hand crank 12 is moved to extend the signaling member, as shown in full lines in Fig. 2, the crank 13 may be moved past dead center and against the inner face 6ª of the side of the housing and thereby acts as a lock to hold the signaling device extended without any further attention on the part of the driver. The crank 13 is moved to the position shown in dotted lines in Fig. 2 to fold the device, and it may be moved also past dead center in this direction to hold the device closed. The throw of the crank 13 is materially less than the throw of the crank 21, so that the movement of the former through an angle of 180° serves to move the latter through an angle of only about 90°. When arranged as indicated, therefore, the force exerted through the connecting rod 22 is directed considerably to one side of the axis about which the blades 14 rock, and there is no binding action. The cover plate 24 is arranged so as to constitute a complete closure for the housing 6 when the signaling device is folded. The entire device, therefore, when not in use, is scarcely noticeable, and yet by a simple movement of the hand crank 12 it may be moved to a position to display a conspicuous signal, and will at once become locked in that position.

While I have shown and described the invention particularly with reference to an automobile, it is, of course, apparent that it may be used in other relations wherever it is desired to display a signal or semaphore. The details of construction may also be considerably modified within the scope of the appended claims and without sacrificing any of the advantages of the invention.

What I claim is:

1. The combination with a vehicle body, of a housing secured to the outer face of the side wall thereof, a blade normally within said housing and pivoted at its upper end to swing in a vertical plane transversely to said body, a plate secured to the blade and constituting the outer wall of the housing when said blade is swung into the housing, a crank arm extending from the inner end of the blade, a rock shaft extending through the side wall of said body, a crank secured to said rock shaft outside of said wall and in a plane at right angles to the plane of the blade, a pitman connecting said cranks, and means secured to the inner end of the rock shaft for actuating the same.

2. In a signaling device, the combination of a housing, a series of juxtaposed coaxial blades pivoted within the housing, a crank arm connected with the first blade of the series, a pitman extending downwardly from said arm, a rock shaft extending inwardly from said housing parallel to the planes of movement of said blades and having a crank arm connected to the lower end of said pitman, whereby said shaft may be rocked to swing said first blade outwardly from the housing, a fixed blade at the other end of the series, co-engaging means between successive blades to cause them to spread out like a fan when the first blade of the series is swung outwardly, means secured to the inner end of the rock shaft for actuating the same; and a plate secured transversely of the outer edge of said first blade and engageable with the other blades of the series to return the same when said first blade is returned within the housing, said plate constituting a closure for the outer face of the housing.

3. In a signaling device, the combination of a blade pivoted near one end to swing in a vertical plane, a rock shaft having a crank arm thereon, a pitman connecting said crank arm to the blade, the connection between the blade and the pitman being at a greater distance from the axis of the blade than the connection between the pitman and the crank arm is from the axis of the rock shaft, and disposed at such an angle that a throw of the crank arm through an angle of 180° moves the blade from vertical position to horizontal position, or vice versa, means for actuating said rock shaft, and means for positively stopping the rock shaft as the crank passes dead center position, whereby to lock the blade in its limiting position.

4. In a signaling device, the combination of a blade pivoted near one end to swing in a vertical plane, and having an extension beyond its pivot disposed at such an angle as to incline downwardly when the blade is in horizontal position and to incline upwardly when the blade has been swung downwardly to vertical position, a pitman connected at one end to said extension and in substantially upright position, a rock shaft having a crank arm connected to the other end of the pitman, the lengths of said crank arm and pitman being such that the throw of the pitman from one extreme position to the other moves the blade through an angle of substantially 90°, and means for actuating said rock shaft.

5. In a signaling device, the combination of a blade pivoted to swing in a vertical plane, a rock shaft having a crank thereon, means operable by a throw of said crank through an angle of 180° to swing said blade through an angle of substantially 90°, and means for positively stopping said rock shaft and crank as the latter passes dead center position, to lock the blade at the limit of its movement.

6. In a signaling device, the combination of a housing, a blade pivotally connected to the housing to swing from a vertical position within the housing to a horizontal position extending from the housing, a rock shaft having a crank thereon, and means operable by a throw of said crank through an angle of 180° to swing said blade through an angle of substantially 90°, said crank, as it passes dead center position, being engageable with the side of the housing to positively stop its movement, thereby locking the blade in its limiting position.

In testimony whereof I have hereunto signed my name to this specification.

WENDELL J. MORSE.